FIG. 1.

Inventor
J. W. Eldred
By M. S. McDowell
Attorney

Jan. 9, 1951 J. W. ELDRED 2,537,660
APPARATUS FOR THERMALLY SEVERING MOIL
FROM HOLLOW ARTICLES OF GLASSWARE
Filed Nov. 1, 1947 9 Sheets-Sheet 3

Inventor
J. W. Eldred
By
N. S. McDowell
Attorney

FIG. 6.

Inventor
J. W. Eldred

Jan. 9, 1951 J. W. ELDRED 2,537,660
APPARATUS FOR THERMALLY SEVERING MOIL
FROM HOLLOW ARTICLES OF GLASSWARE
Filed Nov. 1, 1947 9 Sheets-Sheet 6

Inventor
J. W. Eldred

By W. S. McDowell
Attorney

Jan. 9, 1951  J. W. ELDRED  2,537,660
APPARATUS FOR THERMALLY SEVERING MOIL
FROM HOLLOW ARTICLES OF GLASSWARE
Filed Nov. 1, 1947  9 Sheets-Sheet 7

Inventor
J. W. Eldred
By W. S. McDowell
Attorney

Jan. 9, 1951 J. W. ELDRED 2,537,660
APPARATUS FOR THERMALLY SEVERING MOIL
FROM HOLLOW ARTICLES OF GLASSWARE
Filed Nov. 1, 1947 9 Sheets-Sheet 8

Inventor
J. W. Eldred

By W. S. McDowell
Attorney

Patented Jan. 9, 1951

2,537,660

UNITED STATES PATENT OFFICE 2,537,660

APPARATUS FOR THERMALLY SEVERING MOIL FROM HOLLOW ARTICLES OF GLASSWARE

John W. Eldred, Columbus, Ohio

Application November 1, 1947, Serial No. 783,597

5 Claims. (Cl. 49—50)

This invention relates to automatic machines for forming articles of glassware. In the manufacture of table glasses or drinking tumblers, particularly, the ware receives its initial configuration in molding or forming machines. When discharged from the molds of such machines, the ware includes an excess quantity of glass around the open ends thereof, known in the art as the moil. Before the glassware is usable, it is necessary to remove the moil therefrom and finish and round the resulting mouth-contact edges.

It is an object of the present invention to provide an improved automatic machine of high capacity for rapidly, efficiently and economically removing moil formations from hollow articles of glassware.

Another object is to provide such a machine wherein the moil is removed by intensely heating the articles in a plane of moil severance while the articles are supported in inverted positions in rotating, table-carrying chucks, means being provided for applying stretching forces to the moil ends of the glassware when the same soften through heating, whereby to effect a sharp and clean separation of the moil without leaving tear imperfections on the moil-removed glassware.

A further object of the invention is to provide a burn-off machine in which the articles of glassware are retained in rotatable chucks through the agency of suction and wherein improved distributor means are provided for regulating the application of such suction forces to the glassware in the automatic loading, operation performing and unloading of the machine, said distributor means providing for the positive ejection of the moil-removed glassware from the chucks through the introduction of air under super-atmospheric pressure into the chucks at the conclusion of the period of suction retention of the ware therein.

A still further object is to provide a machine for burning the moil from initially formed articles of glassware, the machine having a rotatable turret or table carrying a plurality of gaseous fuel burners in which the glass articles are partially inserted, and wherein improved valve means, controlled by the rotation of the turret, are provided for governing the delivery of oxygen and a gaseous hydrocarbon to the burners during rotation of the turret through a predetermined number of degrees of its complete cycle of rotation, whereby to provide for the heating of the glassware to temperatures effecting the removal of moil therefrom, the rounding of the moil-removed edge of the glassware, the cooling of the ware and its removal from the machine during each complete cycle of rotation of the table or turret.

Other objects are to provide a burn-off machine of the character indicated with means for automatically discharging the burned off moil from the machine; with automatic means for ejecting imperfect ware from which the moil may not have been fully removed during the burning and stretching operations; the provision of an improved take-off mechanism for automatically removing finished ware from the machine; the provision of an improved valve means for preventing the development of suction forces in the article-holding chucks in the event an article should not be positioned in a chuck during the normal operation of the machine, and in various other structural and operational features hereinafter more fully defined.

The preferred embodiment of my invention is illustrated in the accompanying drawings, wherein similar characters of reference designate corresponding parts and wherein.

Referring more particularly to the drawings, the numeral 20 designates the base of my improved glass burn-off machine, the same comprising a relatively heavy ribbed casting which may be provided with small-diametered rollers 21 by which a limited degree of portability may be imparted to the machine. The base carries a gear case 22 in which is rotatably journaled a shaft 23 adapted to be driven by an electric motor, or other source of power. The end of the shaft terminating within the gear case is formed with a pinion 24, the teeth of which mesh with those of a horizontal gear 25 carried by a vertically journaled shaft 26, supported for rotation axially and vertically within the case 22. The upper end of the shaft 26 projects above the top of the case and has fixed thereto a spur-toothed pinion 27, the teeth of which mesh with circumferential teeth provided on a horizontally arranged bull gear 28.

The bull gear is disposed in a base-mounted housing 29 formed with a detachable cover member 30, and secured to and positioned on the top of the cover member is a tubular center hub 31. The bull gear 28 has its hub 32 fastened as at 33 to the lower region of a table shaft 34. Below the gear 28, the shaft 34 has fastened thereto a collar 35 which engages a thrust bearing 36 supported on the base 20. The table shaft is rotatably supported at its lower end by the bearing 36 and also by the vertically aligned bearing sleeves forming a part of the cover member 30 and the center hub 31. Above the center hub, the table shaft is annularly shouldered as at 37, and positioned in a sleeve 38 of a hub 39 forming the axial center of a revoluble horizontally disposed spindle table or turret 40. The hub of the table is suitably fastened to the upper end of the table shaft so that the table rotates in unison with the shaft.

Rotatably supported in equidistantly spaced relation around the outer circumference of the table are tubular spindles 41, said spindles being received in vertical bearing openings 42 provided circumferentially at spaced intervals in the table. At their lower ends, the spindles carry chucks 43 which are adapted to receive the inverted base ends of a hollow article of glassware 44, such as a drinking tumbler. Such an article is retained within its associated chuck by the use of suction, applied in a manner hereinafter more fully described, and while so retained within a chuck, the spindles are rotated to cause rotation of the retained article about its vertical longitudinal axis.

In the production of drinking glasses, such articles receive their initial shape and configuration in a molding or forming machine, not shown, and when released from the molds of such a machine, each article comprises a hollow body 45 having a closed base end 46 and a corrugated open-ended portion known in the art as the moil, which is indicated at 47. From the forming machine, the initially shaped articles are deposited on a conveyor, such as that indicated at 48, at regularly spaced longitudinal intervals. Coordinated with the movement of the conveyor is a transfer mechanism 49, which is diagrammatically disclosed in Fig. 2. Such a transfer mechanism may be of the form disclosed in my prior Patent No. 2,415,997 dated February 18, 1947. This mechanism includes generally a rotatable head 50 from which project radial arms 51 carrying at their outer ends relatively movable article-gripping fingers 52. As the articles are moving in unison with the conveyor, the same are gripped by the closing of the fingers 52 and removed from the conveyor. The head 50 rotates, as indicated by the arrow in Fig. 2, and during such rotation the arms 51 rotate about their longitudinal axes through an arc of substantially 180 degrees so that when the articles come into registration with the circumferential portions of the burn-off machine, the same are in inverted positions, with the base end of the article disposed upwardly, as in Fig. 3.

Rotatable in unison with the table or turret 40 is a ring member 53, upon which is seated a plurality of gaseous fuel burners 54. Each of these burners includes a ring-shaped body 55 formed with an internal annular chamber 56 for the reception of oxygen, or compressed air, if desired, and a gaseous hydrocarbon, the said gases being mixed to constitute a highly combustible fuel. The inner wall of the body 55 is formed with a plurality of restricted orifices 57 through which the gaseous fuel escapes from the chamber 56 and, when ignited, the flame impinges on the outer walls of the glass articles 44 immediately above the moils 47 of each thereof, whereby to heat the glass locally to temperatures sufficiently high so that the moils may be removed from the main bodies of the articles. The means for controlling the introduction of the gaseous fuel mixture into the chamber 56 are described in detail hereinafter.

The burners 54 are located above openings 58 formed in the ring member 53 and positioned axially in each of these openings is an article support 59. Each of these supports is mounted on the upper end of a hollow vertically disposed tube 60. These tubes are positioned intermediately of their length in sleeves 61 carried by brackets 62 which, in turn, are secured as at 63 to companion brackets 64 depending from the rotatable ring member 53. The lower end of each of the tubes 60 is secured to a collar 65 carried by an arm 66, the latter, in turn, being carried by and projecting laterally from the lower end of a sleeve 67. Each of the sleeves 67 is mounted for vertical sliding movement on a vertical rod 68 which depends from the ring member 53.

Positioned in each of the tube 60 is a rod 69 which terminates at its upper end in a pair of spaced collars so formed as to provide an annular groove 70 in the upper end of the rod. Disposed in this groove are the ends of a pair of arms 71 formed with moil-gripping fingers 72, the latter being pivoted as at 73 for swinging movement in connection with the slotted walls 74 of a sleeve 75 depending from the article supports 59 and surrounding the upper end of each of the tubes 60. The upper ends 76 of the fingers 72 possess a Y-shaped configuration in order that they may effectively grip the outer surfaces of the moil 47 of each of the glass articles, as in Fig. 11, whereby as the article is gripped by the fingers, following heating of the glass by the burners 54, stretching forces may be applied to the thermally deformable moil portions to effect stretching or elongation thereof, whereby to facilitate the removal of the moil along definite lines of separation from the bodies of the glass articles.

Figure 10:
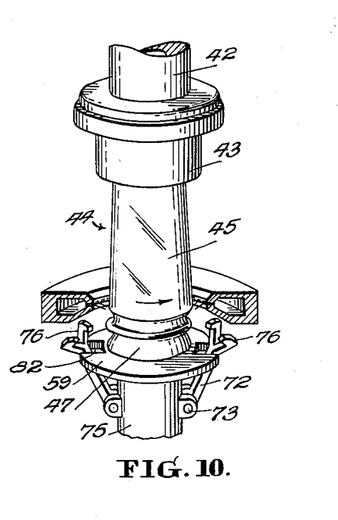
Fig. 10 is a detail perspective view, partly in vertical section, disclosing one of the article-supporting chucks, a moil burner and the moil-gripping means.

When the ware is first deposited on the upper surfaces of the supports 59 by the operation of the transfer mechanism 49, the fingers 72 are in their open or spread positions, as shown in Fig. 10. Heating of the ware takes place in the region designated "heating zone" of Fig. 2. When the ware has been locally heated by the burners to a deformable temperature, the fingers are moved into engagement with the moils, as in Fig. 11. This is accomplished by the operation of the rods 69 which at their lower ends project below the arms 66 and are provided with washers 77, coil springs 78 surrounding the lower ends of the rods 69 and being positioned between the washers 77 and the arms 66, the tendency of the springs being to force the rods 69 downwardly so that the fingers 72 are maintained in contact with the moil regions of the ware, as in Fig. 3. When the fingers are out of engagement with the moil of an article of glassware, the lower ends of the rods 69 engage with a finger cam 79 which elevates the rods and rock the fingers about their pivotal axes to their open or spread positions.

The arms 66 carry rollers 80, which engage with a second fixed cam 81 on the base of the machine, whereby to slide the sleeves 67 on the rods 68, thus raising and lowering the article supports 59 and their associated tubes 60, permitting the article supports to be elevated when ware is deposited thereon and lowered during the burning and stretching operation. The supports 59 are slotted as at 82 to receive guidingly the fingers 72. The stretching of the glassware takes place during the movement of the table or turret through the segment indicated by the legend "stretching zone" in Fig. 2. This stretching operation has been disclosed in Figs. 12 and 13, where it will be observed that when the glass is heated and downward forces applied to the moil by the action of the fingers 72 and the weight of their associated controls, the molten glass tears itself loose from the body of the glassware until the moil is completely separated.

Figure 2:
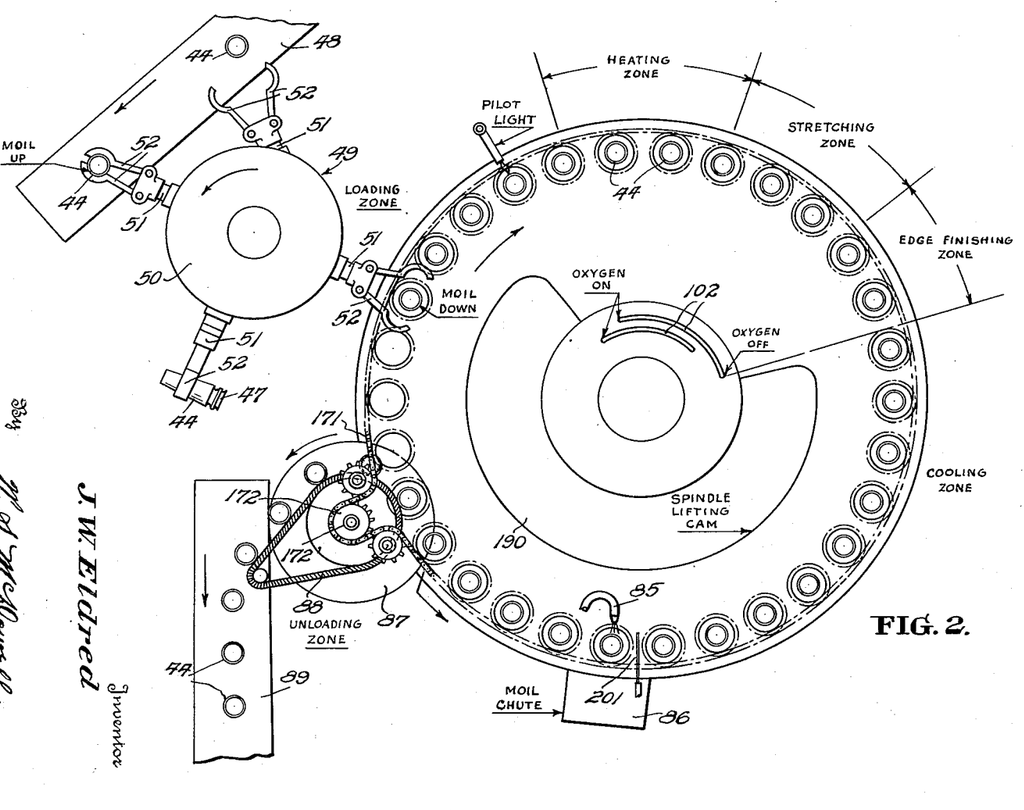
Fig. 2 is a diagrammatic top plan view of the burn-off machine, disclosing the associated transfer mechanism for delivering hollow glass articles to the machine and removing the articles from the machine after the burning of the moil portions therefrom, the figure also showing the various operational zones through which the articles pass while retained by the machine.
Figure 11:
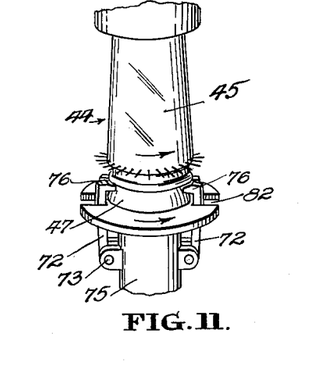
Fig. 11 is a similar perspective view disclosing the moil-gripping means in active engagement with the moil portion of an article of glassware.
Figures 12, 13:
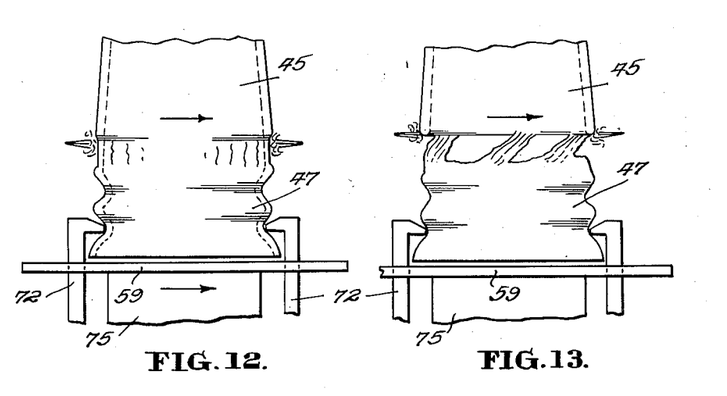
Fig. 12 is a detail side elevational view disclosing the initial stretching and severing of the heated moil from the body of the article of glassware.
Fig. 13 is a similar view disclosing the final stages of separation of the moil from the article of glassware.
Figure 14:
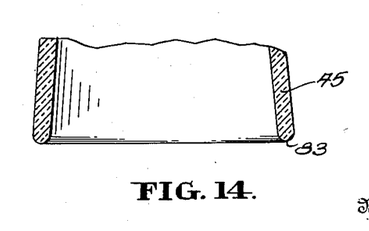
Fig. 14 is a detail sectional view disclosing the edge of the article of glassware and the formation thereof after the moil has been removed.

After initial engagement of the fingers 72 with the moil, rotation of the support 59 in unison with the glassware takes place, as shown in Figs. 11 and 12. However, as the glassware approaches the severing point, as in Fig. 13, such rotation ceases as the glassware at its plane of heating is too molten or fluid to transmit motion from the chuck-revolved glassware to the moil support. The stretching forces exercised on the moil are maintained, which coupled with the rapid rotation of the chucks causes the moils to separate cleanly and sharply and without tear formation, thus avoiding rotation of the moil supports during final stages of moil separation. The application of heat is continued in order to produce rounded or beaded edges on the glassware, as indicated at 83 in Fig. 14. This heating period to produce the beaded edges is shown in Fig. 2 by the legend "edge finishing zone," indicating the extent of rotary movement of the table during the finishing operation.

Somewhat before or at the conclusion of the finishing operation, the supply of combustible gases to the burners is shut off and the chuck spindles 41 are elevated by cam action as hereinafter defined. At or about the same time, the moil supports 59 are lowered through the engagement of the rollers 80 with a declivity in the cam 81 and the ware passes through a zone of cooling with the rotation of the table, the "cooling zone" being indicated in Fig. 2. As the table continues to rotate, the removed moils are brought into registration with a compressed air jet 85, which forces the removed moils from the supports 59 into a discharge chute 86. Continued rotation of the table registers the moil-removed articles of glassware with a rotary takeout disk 87 and the vacuum on the chucks 43 is released so that the articles of glassware are removed from the table and, by the operation of a traveling belt 88, deposited on a run-out conveyor 89, which usually leads to a tempering leer, not shown, wherein the glassware undergoes additional heat treatment.

To supply the burners 54 with a hydrocarbon gas and oxygen, the fuel gas enters the top of the machine, from any suitable source of supply, through the pipe line 90. The gas line terminates in a fluid-tight revolving joint or union 91, and enters a head chamber shown at 92, which is mounted on a revoluble top of the table or turret 40. From the chamber 92, a plurality of gas-conducting pipes 93 extend to the individual burners 54 which are carried by the rotating ring member 53. These pipes may be equipped with hand actuated valves 94, the operating stems 95 of which being accessible from the circumferential portion of the table 40. The pipes 93 terminate in mixer shells 96, also mounted on the ring member 53, and in which oxygen or air under pressure is introduced to form the final combustible mixture which is delivered to the orifices 57 of the burners.

Figure 7:
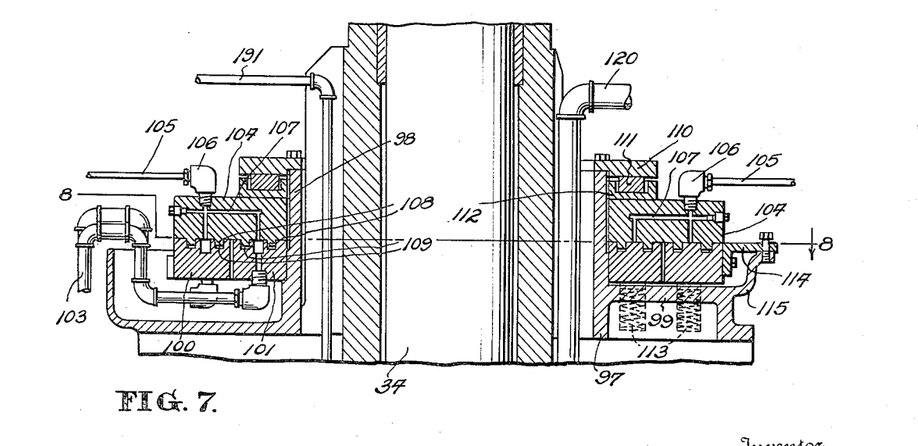
Fig. 7 is an enlarged detail vertical sectional view of the oxygen-distributing mechanism for supplying oxygen to the moil burners.
Figure 8:
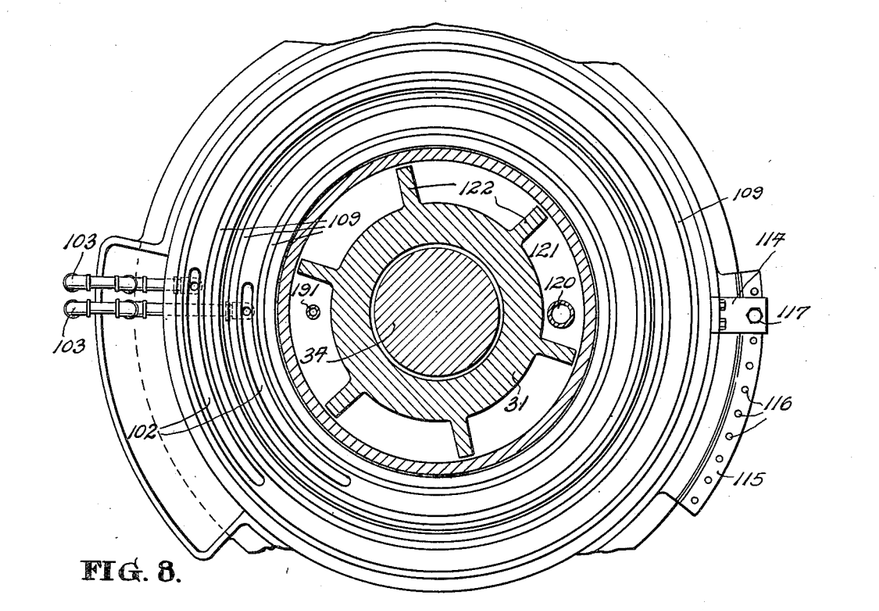
Fig. 8 is a horizontal sectional view on the line 8—8 of Fig. 7.
Figure 9:
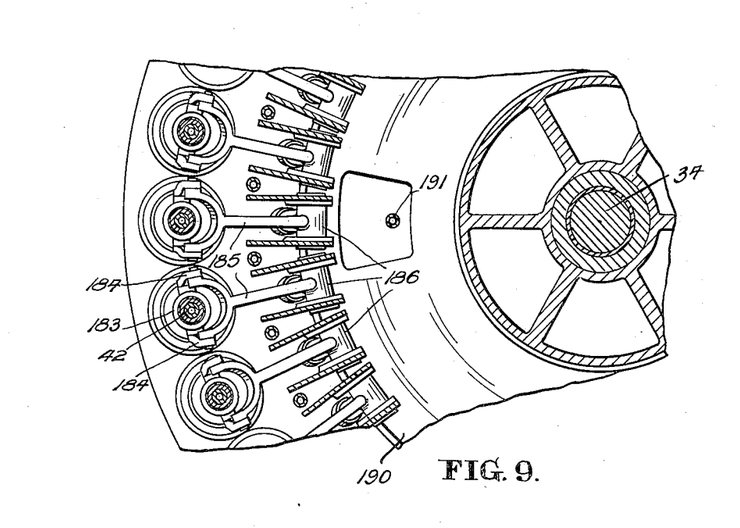
Fig. 9 is a similar view on the line 9—9 of Fig. 1.

To control the flow of air or oxygen, preferably the latter, to the mixer shells, there is mounted on the cover member 30 of the housing 29, and around the hub center 31, as shown in Figs. 7 and 8, a collar 97, the latter being formed with an axially disposed annular upstanding sleeve 98. Supported on the horizontal flange 99 of the collar 97 are concentrically disposed distributor rings 100 and 101. These rings are each formed with elongated arcuate slots 102 which communicate with oxygen-supply pipes 103, the latter leading to any suitable source of oxygen supply under pressure, such as an oxygen tank, not shown.

Mounted on the rings 100 and 101 is a rotating valve ring 104 which is joined for rotation with the table 40 and the ring member 53 by a plurality of oxygen-conducting pipes 105 which extend from the valve ring 104 to the mixer shells 96, the pipes 105 being connected by fittings 106 with communicating passages 107 formed in the ring 104 and which communicate with the arcuate slots 102 of the rings 100 and 101 as the table 40 rotates. The valve ring 104 is provided on its under surface with concentric ribs 108 which enter concentric grooves 109 formed in the upper surfaces of the rings 100 and 101 to produce a fluid-tight seal. Also, the valve ring is held down on the distributor rings 100 and 101 by means of an annulus 110 which is fastened to the upper end of the sleeve 98 of the collar 97. The annulus is formed with a depending circular rib 111 which is received in a correspondingly shaped groove provided in a wear ring 112 disposed on the top of the valve ring 104. Close-fitting engagement between the rings 100 and 101 and 104 is also maintained by the provision of coil springs 113, which are mounted in sockets provided in the collar 97 and press upwardly against the under sides of the rings 100 and 101 to produce a close running fit, eliminate gas leakage and compensating for wear.

To control the duration of the period in which oxygen is supplied to the burners, the outer distributor ring 100 is provided with an outwardly and laterally projecting bracket 114 which registers with a segmental bracket 115 carried by the collar 97. The bracket 115 is formed with a multiplicity of spaced openings 116 which are threaded to receive a fastening bolt 117 carried by the bracket 114. By this arrangement, the outer ring 100 may be adjusted about the axis of the table shaft 34 and maintained in its positions of adjustment, thereby varying the relative positions of the arcuate slots 102 provided in the rings 100 and 101. The effect of this adjustment is to vary the effective length of the slots 102, so that by shortening or extending such effective length, the duration of the period of oxygen supply to the burners may be correspondingly lengthened or shortened.

To control the application of vacuum or suction forces to the chucks 43 for the purpose of firmly maintaining the glass articles 44 in said chucks during the moil burning-off operations, the upper end of the center hub 31 has fixed thereto an annular housing 118. This housing includes a circular internal chamber 119, into which extends one end of a vacuum-establishing pipe 120. This pipe extends, in part, through a groove 121 formed between radiating vertical fins 122 provided exteriorly on the hub 31, and leads to a source of vacuum or suction-producing means, such as a vacuum pump, not shown.

Mounted on the upper surface of the housing 118 is a stationary ring 123 formed with arcuate slots 124, and 124', similar to the slots 102, this slot communicating by means of openings and passages, shown at 125, with the chamber 119 of the housing 118. Arranged on the stationary ring 123 is a rotatable ring 126, which is joined with the table 40 for rotation therewith. The under surface of the ring 126 is formed with depending circular ribs 127 which are received in correspondingly shaped grooves 127' provided in the stationary ring 123 to assist in providing fluid-tight joints between the rings 123 and 126. The rotatable ring is formed with passages 128 which communicate with the arcuate slot 124 during a predetermined number of degrees of rotation on the part of the table 40.

Figure 6:
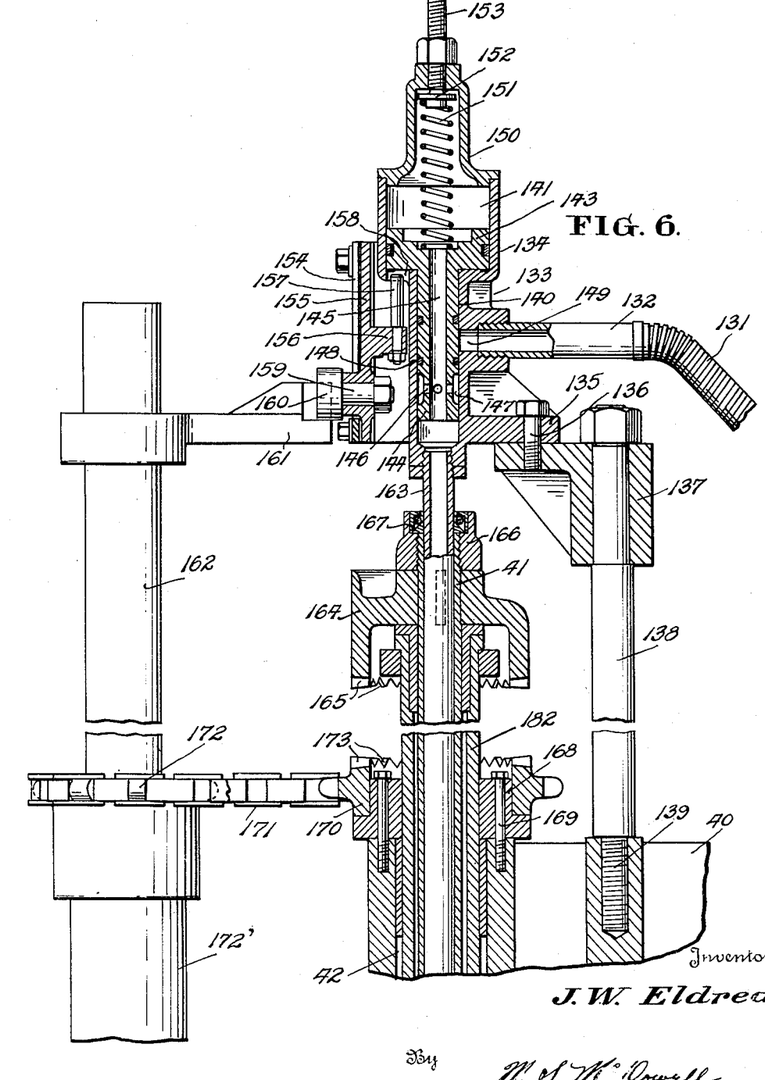
Fig. 6 is an enlarged vertical sectional view taken through the upper end of one of the rotating chuck spindles and the associated valve means for applying suction-establishing forces thereto.

Leading from the passages 128 are upright rigid pipes 129 which are carried by the table, and the upper ends of the pipe 129 terminate in fittings 130 which are joined with flexible pipe sections 131 which, as shown in Fig. 6, have their outer ends connected with threaded nipples 132 projecting laterally from vacuum valve cylinders 133. These cylinders are formed with housings 134 having offset flanges 135 at their lower ends which are bolted as at 136 to lug members 137, the latter being positioned on the upper ends of vertical bolts 138, the lower reduced ends 139 of said bolts being threaded in sockets formed with the table 40.

Each of the cylinder housings 134 includes a valve bore 140 and a larger diametered piston bore 141. A piston valve is mounted in each of these cylinders and includes a head 143 having close-fitting engagement with the walls of the bore 141, the piston terminating in a depending valve stem 144 which is received in the valve bore 140. Each piston valve is formed with an axial passage 145 extending entirely through the same and toward its lower end each of these passages communicates with laterally directed ports 146 and an annular groove 147 formed in the outer wall surface of the stem 144. Above the groove 147, each stem 144 is additionally provided with grooves for the reception of expansible sealing rings 148, the latter having close-fitting engagement with the inner walls of the valve bore 140. The spacing of the rings 148 is such, as indicated in Fig. 6, that when the chuck is elevated, the rings will be disposed on opposite sides of a vacuum passage 149 communicating with the nipples 132. The upper end of each of the valve housings 134 is provided with a bonnet 150 in which is positioned a coil spring 151, the lower end of the latter being seated on the valve head 143 while the upper end of each spring engages with an adjustable seat 152 which is carried by an adjusting screw 153 threaded into the upper end of the bonnet 150. The adjustment of the screw provides for regulating the expansive force exercised by the spring on its associated valve member.

Exteriorly, each valve housing is provided with a cross head guide 154 and slidably mounted for vertical movement in each of these guides is a cross head 155. Each cross head is formed with a lug 156 from which extends upwardly a pin 157. The upper end of each of these pins enters an opening 158 in the bottom wall of the piston bore 141 so that the pin may engage the under side of an associated valve head 143 to lift the latter against the resistance of its spring 151 or to permit of the controlled descent of the valve. To impart sliding movement to the cross head at controlled times, each cross head carries at its lower end a stud 159 on which is mounted a roller 160. These rollers are disposed for engagement during a certain sector of rotation of the table 40 with a stationary cam 161 positioned on a stationary upright frame post 162 arising from the base of the machine. It will be seen that when the rollers 160 are in engagement with the lift regions of the cam 161, the piston valves associated therewith will be elevated in their respective cylinders, bringing the annular grooves 147 on the reduced stems of such valves into registration with the vacuum passages 149, so that suction forces will be created within the open-ended axial passages of the valves.

The cylindrical valve housings terminate at their lower ends in threaded openings which receive the threaded upper ends of vertically disposed depending tubes 163. Slidably mounted on and telescopingly receiving the tubes 163 are the upper ends of the spindles 41. Keyed to the upper ends of the spindles 41 are crown-shaped clutch members 164, the latter being formed with clutch teeth indicated at 165. Above the clutch member 164, each of the spindles is threaded to receive a nut 166 carrying a packing gland 167, by which fluid-tight engagement may be maintained between the sliding spindles and the inner tubes 163.

Surrounding each of the spindles and positioned on top of the table 40 is a stationary sprocket collar 168, each of these collars being secured to the table by means of the vertical machine screws or bolts 169. The collars are annularly recessed to receive sprocket rings 170, the latter being formed with sprocket teeth which mesh with the links of a power-driven endless chain 171, the latter also passing around a sprocket 172 mounted on a tubular shaft 172' carried on the frame post 162 and, as stated, any suitable means may be provided for imparting rotation to the sprocket 172 to drive the horizontally positioned endless chain 171, the links of the latter meshing with the teeth of each of the sprockets 170. The sprocket rings are also formed with clutch teeth 173, which are adapted to be brought into and out of driving engagement with the teeth 165 of the clutch members 164.

Figures 3, 4, 5:
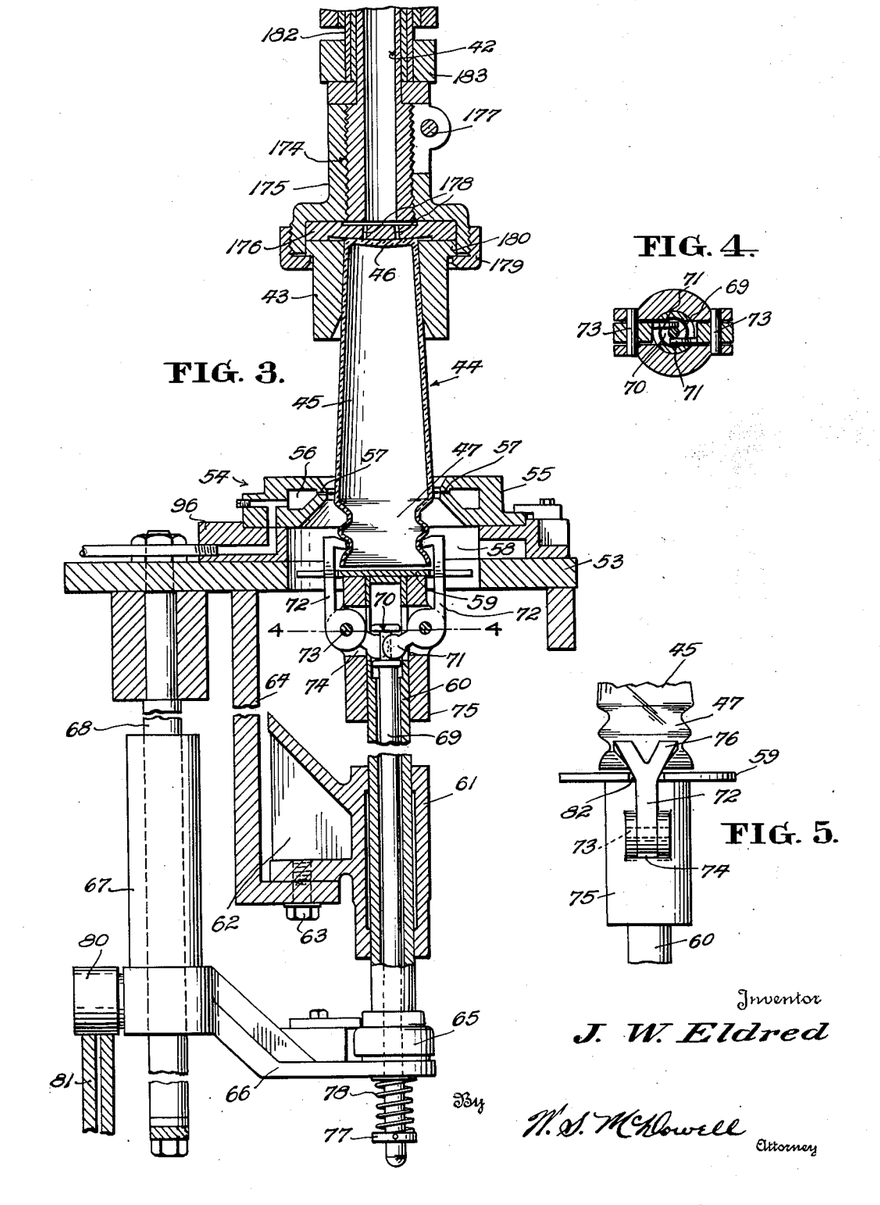
Fig. 3 is an enlarged vertical sectional view taken through one of the rotatable article-supporting chucks, the associated burner mechanism and the moil-removing means.
Fig. 4 is a detail horizontal sectional view taken on the line 4—4 of Fig. 3.
Fig. 5 is a detail side elevational view of the moil-gripping means.

The tubular spindles have their lower ends threaded as at 174 as shown in Fig. 3, and receive a chuck holder 175 in which is positioned a tumbler-engaging bottom plate 176. The holders 175 are individually adjustable on the spindles to adapt the latter to articles of glassware of different heights. The adjustment of the holders may be maintained by transverse clamping screws 177. The plates 176 are perforated as at 178 to apply suction forces directly to the inverted base ends of the articles of glassware. The holders 175 are externally threaded to receive lock rings 179 which engage the flanged ends 180 of the chucks 43, whereby to retain the latter in connection with the holders but to permit of convenient replacement of the chucks, which surround and grip the ware, when ware of different diameters are handled by the machine.

Figure 1:
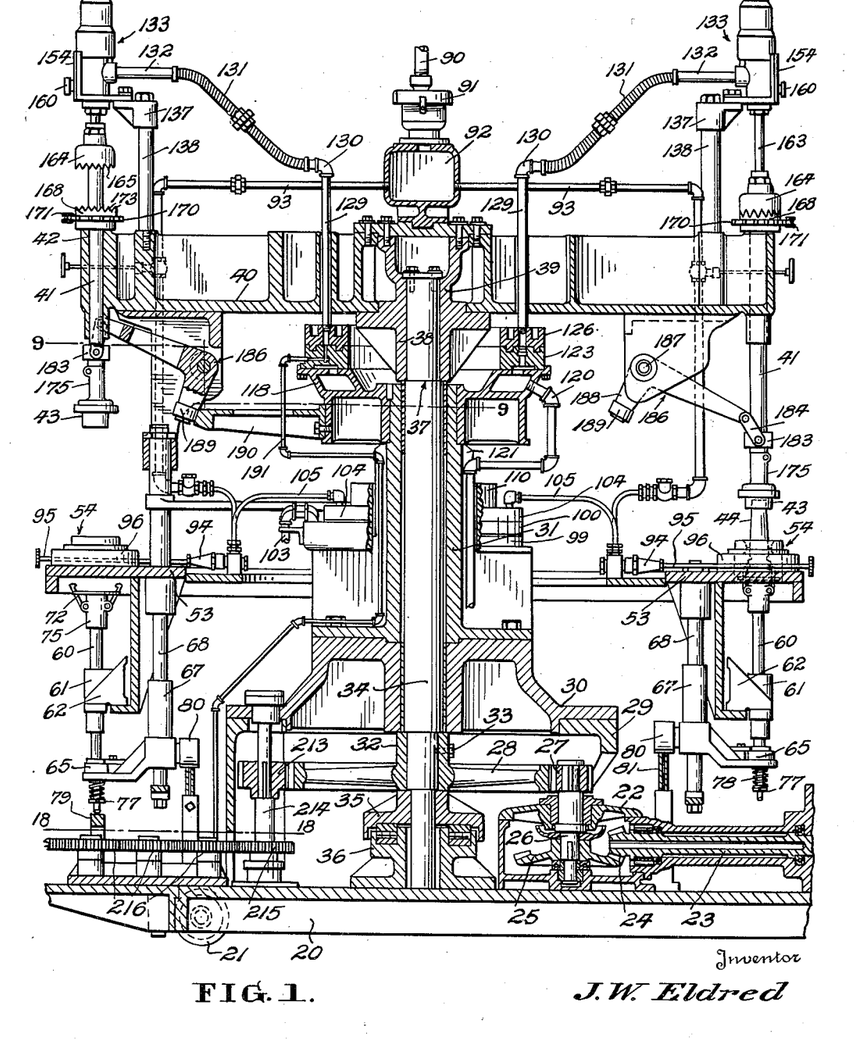
Fig. 1 is a vertical sectional view taken through a burn-off machine formed in accordance with the present invention.

Slidable tubes 182 surround the rotating spindles between the clutch members 164 thereof and the holders 175. The tubes 182 carry collars 183 to which are pivotally united links 184, the said links being also pivotally connected with the longer arms 185 of a plurality of bell crank levers 186, the latter being pivotally mounted as at 187 in connection with the under side of the table 40. The shorter arms 188 of the bell crank levers have their outer ends equipped with rollers 189 which are adapted to be brought into engagement with the peripheral edge of a cam plate 190 connected with the housing 118. When the rollers are in contact with the cam plate 190, as shown at the left of Fig. 1, the chucks 43 and their associated spindles are elevated, interrupting the driving engagement between the clutch members 164 and the clutch teeth 173 of the sprockets 172, thus discontinuing rotation of the chucks and providing room for the insertion of ware on the article supports 59.

It will be noted that when the valve 144 is lifted through cam action, the passages 146 and 147 will register with the passage 149 of the valve casing. Through the axial passage 145, suction forces will be transmitted to the chucks, thereby positively holding the articles of glassware in the chucks during the operation of the machine. If for any reason, a chuck should not receive an article of glassware from the transfer mechanism, the valve 144 in communication with such a chuck will remain closed to the passage 149, since the normal suction in the chamber 141 lifts the piston head 143 when a glass is properly held in the chuck, but if the glass is improperly seated, or not present, when the roller 160 leaves the cam 161, atmospheric air enters the chamber 141 and the spring 151 restores the valve 144 to its lowered position, cutting off the suction force.

Figure 15:
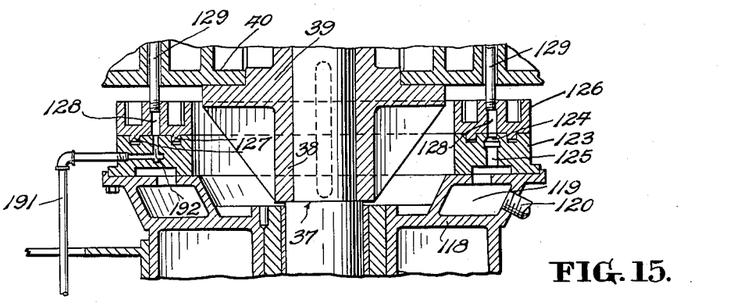
Fig. 15 is a detail vertical sectional view taken through the suction distributor mechanism.
Figure 16:
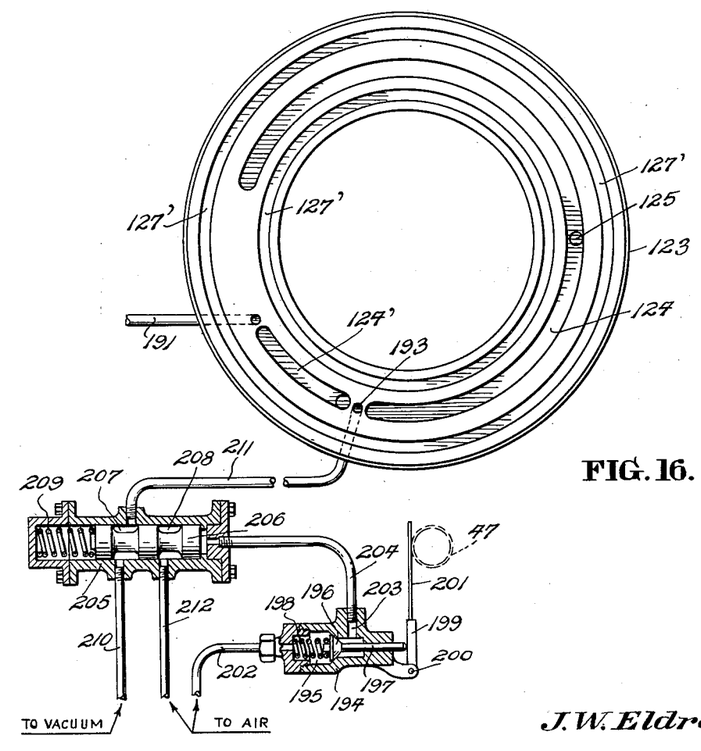
Fig. 16 is a horizontal sectional view of the suction distributor mechanism and associated valves for controlling the ejection of imperfect ware from the machine.

When the ware is discharged from the chucks and deposited on the take-out disk 87, not only are the suction forces discontinued but a positive jet of air is introduced into each chuck under superatmospheric pressure to discharge the retained glassware from the chucks. Thus, as shown in Figs. 15 and 16, a pipe 191 enters the ring 123 and communicates with a passage 192 therein, the pipe 191 leading from a source of compressed air supply. When the pipes 129 register with the passage 192, that is, when a chuck is disposed over the take-out disk, a jet of air under superatmospheric pressure is admitted momentarily into the chuck to forcibly deposit the glassware on the take-out disk.

Again referring to Fig. 16, it will be noted that the arcuate slots 124 and 124' in the ring 123 are separated in order to provide a port 193 between the same. The slots 124 and 124' are separated for the purpose of discharging from the chucks imperfect ware in which the moil is still carried by the ware after the machine has performed its final burning operations thereon. While this is a rare condition, it may happen for various reasons at widely separated intervals of machine operation and to further protect the machine, it is necessary to remove such imperfect ware before the take-out disk is reached in the rotation of the table.

Thus, to accomplish the discharge of such imperfect ware from the machine, use is made of a governing valve 194, shown in Fig. 16. This valve includes a chamber 195 formed with a valve seat, the latter being engaged and normally closed by a head 196 mounted on a sliding valve stem 197. A spring 198 normally maintains the head in its seated position. The stem 197 projects exteriorly of the valve casing and at its outer end engages a trigger 199 which is pivoted as at 200 on the valve casing. The opposite end of the trigger is formed with a flexible blade 201 arranged in the cooling zone of the cycle of rotation of a spindle table or turret. In this zone, the spindles are elevated by the spindle-lifting cam 190 so that the moil-freed ware normally produced by the machine will be disposed somewhat above the plane of the take-out disk 87. With the ware so elevated, if a moil still clings to one of the articles of glassware as a result of incomplete severance, the adhering moil will contact the blade 201, oscillating the trigger 199 and unseating the valve head 196, thus allowing compressed air to flow from the pipe, shown at 202, through the bore of the valve and its outlet port 203.

A pipe 204 extends from the port 203 to one end of a valve cylinder 205 in which is slidably mounted a spool valve 206 having spaced annular grooves shown at 207 and 208. A coil spring 209 is arranged in the cylinder 205 and presses the spool valve forwardly toward the end of the cylinder through which the pipe 204 enters. A vacuum pipe line 210, leading from the source of vacuum or suction enters the cylinder 205 and communicates normally with the space therein defined by the groove 207. From the opposite side of the cylinder, a pipe 211 extends to the port 193 of the ring 123.

Thus in the normal rotation of the table, and in the handling of ware from which the moil has been fully removed, the passage of the table rotated ring 126 over the port 193 does not interrupt the supply of vacuum or suction forces to the spindle chucks. However, when imperfect ware trips the valve 194, air under pressure flows to the cylinder 205, forcing the spool valve 206 therein rearwardly against the resistance of the coil spring 209. This registers the second groove 208 of the spool valve with the pipe 211 and with an air supply pipe 212, so that air under pressure flows to the port 193 and thence to the spindle chuck carrying the imperfect ware bearing an unremoved moil, with the result that such imperfect ware is discharged from the chuck and deposited in the waste glass chute 86 of the machine.

Figure 17:
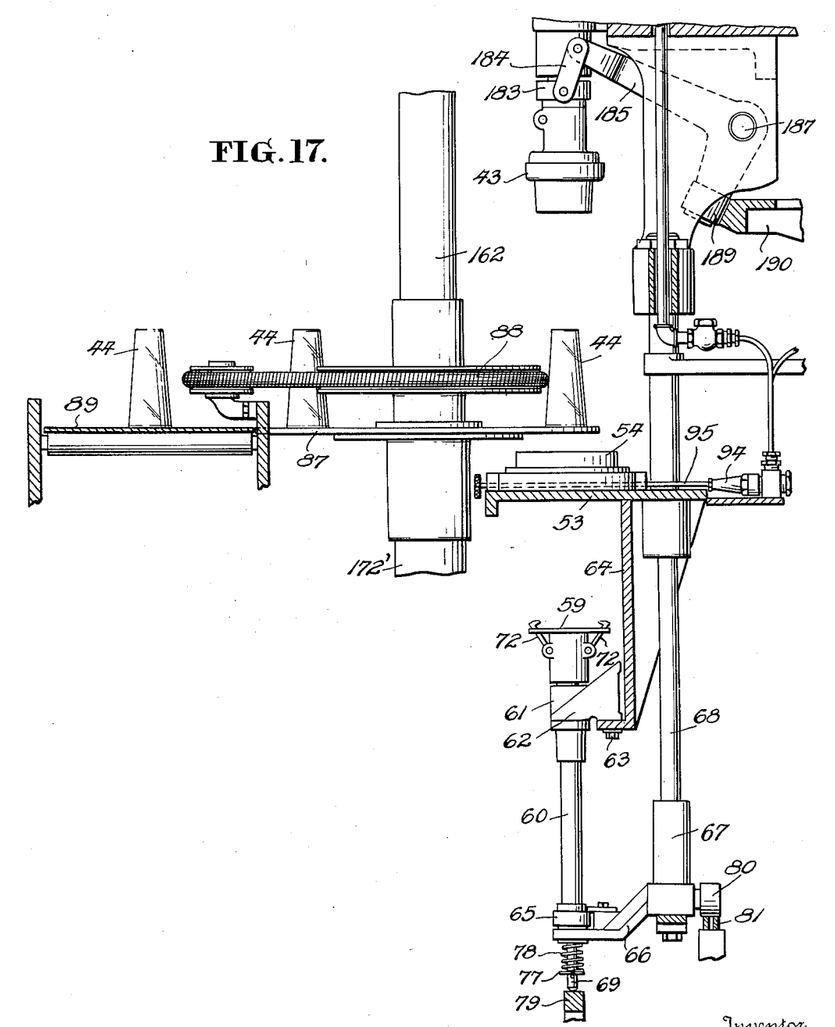
Fig. 17 is a detail vertical sectional view disclosing more particularly the means for discharging formed ware from the machine.

As the chucks pass over the peripheral edge of the take-out disk 87, as shown in Figs. 2 and 17, suction forces thereon are released and through compressed air jet control, the moil-removed ware is deposited on the upper surface of the take-out disk. This disk is rotatably carried by the shaft 172' and by the cooperation of the guiding belt 88, the finished ware is transferred to the run-out conveyor 89. After depositing the ware on the take-out disk, the chucks are fully raised to the position disclosed in Fig. 17, by the action of the bell crank levers 186 and the formation of the cam plate 199, providing room between the chucks and the burner table for the insertion of the glassware to be acted upon by the machine when such ware is released from the transfer mechanism in the loading zone of the table.

In reference to the transfer mechanism shown in Fig. 2, it may be stated that when the gripping fingers 52 are separated, following deposit of the ware on the table, the separated fingers do not interfere with the rotation of the deposited ware in unison with the table or turret, since the supporting arms 51 for the fingers 52 revolve about their longitudinal horizontal axes while the transfer mechanism rotates bodily about its vertical axis, such rotation being coordinated with the rotating movement of the table or turret so that the separated fingers 52 do not contact the deposited ware.

Figure 18:
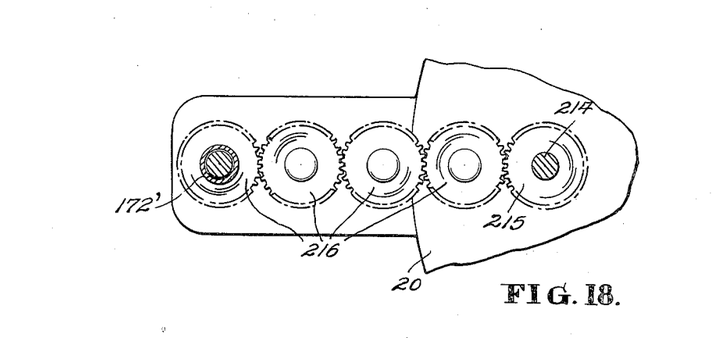
Fig. 18 is a horizontal sectional view taken on the line 18—18 of Fig. 1.

Any suitable mechanism may be employed for imparting power to the shaft 172'. In the present instance, the bull gear 28, opposite to the pinion 27, has its teeth disposed in meshing engagement with a pinion 213 carried by the upper end of a vertically journaled bracing-carried shaft 214. The lower end of this shaft is provided with a gear 215 which meshes with a train of horizontally arranged gears 216 disclosed in Fig. 18, the last gear of this train being fixed to the tubular shaft 172'. This shaft thus rotates the take-out disk 87, revolves the belt 88 and drives the sprockets 172 and 170 employed in rotating the chuck spindles.

In view of the foregoing, it will be seen that I have provided an improved burn-off machine for the rapid and automatic removal of moil prolongations on initially formed hollow articles of glassware. The construction of the machine is such that the ware to be acted thereon may be fed automatically to the ware-holding chucks so that the glassware may be handled while it is in a relatively heated condition by mechanical conveyor transfer means, thus eliminating manual loading of the machine. The spindle carried chucks are arranged at circumferentially spaced intervals around the periphery of the revolving table or turret, and as the glassware is received in inverted positions in the chucks, suction forces are established, positively retaining the glassware in the chucks and effecting rotation thereof. When the heating zone in the rotation of the chucks is reached, the chucks are lowered to bring the moil portions of the glassware into registration with the table-carried burners, which project an intense flame on the glassware immediately above the moil regions to be severed. This flame heats the glassware locally to its softening or melting point while the moil thereafter is gripped by the fingers 72 of the moil supports.

At first, the moil supports rotate with the glassware, but as the latter becomes heated and softens and melts, the wall structure thereof loses rigidity and becomes more or less fluid, thus discontinuing the rotation of the moil supports and allowing the latter through the weight thereof to apply stretching forces to the moil. These stretching forces, coupled with the chuck rotation of the glassware, produces normally a clean and complete severance of the moil regions from the glassware, the latter being supported by the chucks, and the removed moil deposited on the moil-receiving plates 59. The operation of the burners is then continued during the passage of the chucks through the edge-finishing zone of table rotation, eliminating what is known as tear-drop formations on the ware and producing a smoothly rounded edge at the lower open end of the ware of the character depicted in Fig. 14. Continued rotation of the table or turret advances the ware through the cooling zone of Fig. 2, and during this period, the fingers 72 of the moil supports are actuated through contact with the cams 79 to assume open positions and at the same time the moil supports are lowered by the rollers 80 leaving the cam 81 so that said moil supports are disposed below the plane of the table ring 53 so that by the operation of the air jet 85, the removed moil may be discharged from the machine through the chute 86.

As previously stated, if for any reason the moil should not be completely severed from the ware and should remain clinging to the ware as the same enters and passes through the cooling zone of rotation of the table, the means including the trigger 199 and its blade 201 engage such an unremoved moil and interrupt the suction forces applied to the chuck in which the imperfect ware is carried. Simultaneously, a jet of air is introduced into the chuck so that the imperfect ware is forcibly discharged therefrom.

The continued rotation of the table or turret brings the finished ware over the peripheral portion of the take-out disk 87 at which time the suction forces to the chucks holding the ware are sustained and air jets introduced into the chucks to positively effect the deposit thereof on the take-out disk 87 from which it is transferred to the lehr conveyor 89. At the time of ware release from the chucks, the latter are elevated so that they will be above the ware deposited on the plates 59 of the moil-supporting means, which plates at the time of the deposit of the ware having been elevated by the position of the cam 81 acting on the moil-supporting means 66 and 67. The chucks thereafter descend into holding engagement with the ware and the cycle of operation as above given is repeated.

My improved machine is thus characterized by its automatic operation, its high output of finished ware and the elimination of conditions which might interfere with the sustained and proper operation of the machine. Again, through its construction, the machine produces finished ware of entirely satisfactory formation from which physical imperfections are eliminated.

It will be understood that while I have disclosed a single preferred embodiment of my improved burn-off machine, the same is, of course, subject to certain variation or modification without departing from the spirit and scope of the invention as set forth in the foregoing description and defined in the following claims.

I claim:

1. In a machine for burning off moil from hollow articles of glassware, a tubular spindle, an article-holding chuck on the lower end of said spindle, a turret in which said spindle is rotatably journaled, a valve casing mounted on said turret above and in vertical registration with said spindle, said casing being formed with a piston chamber and a valve bore, a piston valve formed with an open ended axial passage and mounted for sliding movement in said bore, said valve being provided at one end with a piston head slidably mounted in said chamber, said casing being formed with a suction passage and said valve with a lateral port extending from the exterior thereof to its axial passage, spring means acting on the head of said valve to maintain the latter normally in a position in which the port thereof is out of registration with the suction passage of said casing, and cam actuated means operable for moving said valve against the resistance of said spring means to effect registration of its port with said suction passage.

2. In a burn-off machine for producing hollow articles of glassware, a rotatable turret, a plurality of valve casings mounted at circumferentially spaced intervals on said turret, each of said casings being formed with a suction passage communicating with a suction-producing means, tubular article-supporting spindles carried by said turret, said spindles communicating with the interior of said valve casings, a valve member slidably mounted in each of said casings and controlling communication between said suction passages and said spindles, spring means maintaining said valve members in a position normally interrupting communication between said passages and said spindles, cam-actuated means engageable with said valve members to move the same against spring resistance to positions providing for communication between said passages and spindles, and means actuated by the presence of suction forces on said valve members to maintain the same in positions providing communication between said passages and spindles against spring pressures and independently of said cam-actuated means.

3. In a burn-off machine for producing hollow articles of glassware, a rotatable turret, a plurality of valve casings mounted at circumferentially spaced intervals on said turret, each of said casings being formed with a suction passage communicating with a suction-producing means, tubular article-supporting spindles carried by said turret, said spindles communicating with the interior of said valve casings, a valve member slidably mounted in each of said casings and controlling communication between said suction passages and said spindles, spring means maintaining said valve members in a position normally interrupting communication between said passages and said spindles, cam-actuated means engageable with said valve members to move the same against spring resistance to positions providing for communication between said passages and spindles, means actuated by the presence of suction forces on said valve members to maintain the same in positions providing communication between said passages and spindles against spring pressures and independently of said cam-actuated means, and hollow article-receiving chucks carried by the lower ends of said spindles, said chucks serving when articles are not positioned therein to establish atmospheric pressures on said valve members and interrupt the application of suction forces thereto which serve to maintain the valve members in positions providing for communication between said suction passages and said spindles.

4. In a machine for burning off moil from hollow articles of glassware, a tubular spindle having an article-holding chuck on the lower end thereof, a turret in which said spindle is rotatably journaled, a valve casing mounted on said turret in communication with said spindle, said casing being formed with a piston chamber and a valve bore, the piston chamber possessing a diameter substantially greater than that of the bore, a piston valve formed with an open-ended axial passage and mounted for sliding movement in said bore, said valve being provided at one end with an enlarged piston head mounted in and having slidable engagement with the walls of said chamber, said casing being formed with a suction passage and said valve with a lateral port extending from the exterior thereof to its axial passage, spring means disposed in said chamber and acting on the head of said valve to maintain the latter normally in a position in which the port thereof is out of registration with the suction passage of said casing, a stationary cam, slidable means rotatable with said turret and engageable with said cam to move said valve against the resistance of said spring means to effect registration of the port of said valve with said suction passage, whereby to retain an article in said chuck through suction forces and to produce suction forces on the head of said valve to maintain the same in a position establishing communication between said suction port and said spindle independently of said cam.

5. In a machine for burning off moil formations from hollow articles of glassware, a base, a turret mounted on said base for rotation about a vertical axis, means for rotating said turret, a plurality of tubular spindles rotatably mounted at circumferentially spaced intervals on said turret, article-holding chucks on the lower ends of said spindles for supporting articles of glassware in an inverted position, burners carried by said turret below said chucks to receive moil prolongations of the articles carried by said chucks and direct severing flames thereon, valve means carried by said turret and cooperative with said spindles to establish suction forces therein for retaining articles in said chucks, a supplemental valve mechanism communicating with a source of fluid under superatmospheric pressure, and trip means carried by said supplemental valve mechanism and engageable with unremoved moil on said articles of glassware when said turret reaches a predetermined position in its cycle of rotation to apply super-atmospheric pressures to the articles containing the unremoved moil to effect their forcible discharge from said chucks.

JOHN W. ELDRED.

REFERENCES CITED

The following references are of record in the file of this patent:

UNITED STATES PATENTS

| Number | Name | Date |
|---|---|---|
| 1,577,543 | Schrader | Mar. 23, 1926 |
| 1,757,211 | Parker | May 6, 1930 |
| 1,996,814 | Kadow | Apr. 9, 1935 |
| 2,349,822 | Gardner | May 30, 1944 |
| 2,402,452 | Schreiber | June 18, 1946 |
| 2,416,121 | Schreiber et al. | Feb. 18, 1947 |